United States Patent [19]

Sayce, deceased et al.

[11] 4,051,367

[45] Sept. 27, 1977

[54] MEASUREMENT APPARATUS

[75] Inventors: Leonard Alfred Sayce, deceased, late of Glasgow, Scotland, by Ethel Margaret Lindsay Sayce, executrix; Robert Martin Pettigrew, Carluke, Scotland

[73] Assignee: National Research Development Corporation, London, England

[21] Appl. No.: 555,817

[22] Filed: Mar. 6, 1975

[30] Foreign Application Priority Data

Mar. 15, 1974 United Kingdom .............. 11598/74

[51] Int. Cl.$^2$ ............................................. H01J 3/14
[52] U.S. Cl. ................................. 250/237 G; 356/169
[58] Field of Search ..................... 250/231 R, 237 G; 356/169, 170; 350/162 R

[56] References Cited

U.S. PATENT DOCUMENTS

| | | | |
|---|---|---|---|
| 3,427,463 | 2/1969 | Weyrauch | 250/237 G |
| 3,586,665 | 6/1971 | Weyrauch | 250/237 G |
| 3,600,588 | 7/1971 | Sayce | 250/211 R |
| 3,700,907 | 10/1972 | Meyer et al. | 250/237 G |
| 3,768,911 | 10/1973 | Erickson | 356/169 |
| 3,796,498 | 3/1974 | Post | 356/169 |
| 3,812,352 | 5/1974 | MacGovern | 250/237 G |

*Primary Examiner*—David C. Nelms
*Attorney, Agent, or Firm*—Cushman, Darby & Cushman

[57] ABSTRACT

In an apparatus for measuring relative displacement between first and second members, a grating fixed relative to the first member is illuminated by means defining a spatially periodic optical object fixed relative to the second member. Light transmitted or reflected by the grating is detected by a system including means defining a spatially periodic light-receiving array fixed relative to the second member so as to interact with an interfernce image formed by the grating, the output of the detection system thus varying cyclically upon relative movement between the first and second members.

23 Claims, 6 Drawing Figures

MEASUREMENT APPARATUS

Cross reference is made to the sole invention in the companion application, Ser. No. 555,818, filed even date herewith by Robert M. Pettigrew, one of the coinventors.

This invention relates to apparatus for measuring displacement of a first member relative to a second member in a manner corresponding to motion with one degree of freedom in a given plane; this motion may be either rectilinear or rotary.

More particularly the invention is concerned with apparatus of this kind utilising metrological gratings. Various types of such apparatus are in common use in fields such as the control of machine tools. These known types of apparatus comprise a pair of gratings of the same or nearly the same periodicity, which are respectively mounted in fixed positions relative to the two members whose relative displacement is to be measured; one grating is transmissive and the other either transmissive or reflecting, the grating combination being illuminated by a suitable light source and means being provided for responding to the variations of the light transmitted or reflected by the grating combination which occur due to relative movement between the two gratings. A number of problems are encountered in the design and use of these known types of apparatus, among them being a requirement for highly collimated illumination of the grating system, a requirement for very accurate maintenance of the spacing between the gratings, and in some cases the use of a very small spacing between the gratings. Since these problems are particularly acute when fine gratings are used, it has been common practice to use gratings which are coarser than those required to give directly a desired degree of resolution in the measurement, and to obtain this resolution by means of interpolation techniques; these techniques in themselves, however, involve potential sources of error.

The present invention is based upon the concept of using the optical imaging properties of a grating in respect of a spatially periodic optical object, and has as its aim the provision of arrangements by means of which some or all of the problems referred to above may be avoided, thereby making it more readily possible to produce relatively simple systems in which a desired degree of resolution may be achieved without employing interpolation techniques.

According to the invention there is provided an apparatus for measuring displacement of a first member relative to a second member in a manner corresponding to motion with one degree of freedom in a given plane, said apparatus comprising a substantially planar grating mounted in a fixed position relative to said first member so as to lie substantially in a first plane parallel to said given plane, said grating having lines which are spatially periodic in the sense of said motion and having a given pitch, means for illuminating said grating diffusely with light including light of a given wavelength, said illuminating means comprising means mounted in a fixed position relative to said second member and defining an optical object which lies substantially in a second plane parallel to said given plane and is spatially periodic in said sense, and photodetector means responsive to light of said given wavelength by means of which an image of said object is formed by said grating, said photodetector means comprising means mounted in a fixed position relative to said second member and defining a light-receiving array which lies substantially in a third plane parallel to said given plane and is spatially periodic in said sense, the geometry of said apparatus satisfying the conditions that a. the product of said given wavelength and the spacing between said first and second planes is not less than half the square of said pitch, and b. the spatial periodicities in said sense of said grating, said object and said light-receiving array are respectively proportioned in substantially the same manner as the sum of the respective spacings between said first plane and said second and third planes, twice the spacing between said first and third planes, and twice the spacing between said first and second planes.

It should be noted that with an apparatus according to the invention a given relative displacement between said first and second members will result in a larger relative displacement between the image formed by said grating and said second member.

In a preferred arrangement, said grating is a reflecting grating and said second and third planes are substantially coincident; it will be appreciated that the condition (b) then requires that the spatial periodicities in said sense of said grating, said object and said light-receiving array should all be substantially the same. With this arrangement a given relative displacement between said first and second members will result in twice as large a relative displacement between the image formed by said grating and said second member, so that a relative displacement between said first and second members corresponding to one cycle of the spatial periodicity of said grating will result in two cycles of variation in the output of said photodetector means.

It is to be understood that in this specification the term "light" includes ultra-violet and infra-red radiation as well as visible radiation.

The invention will be further described and explained with reference to the accompanying drawings, in which.

Figure 1:
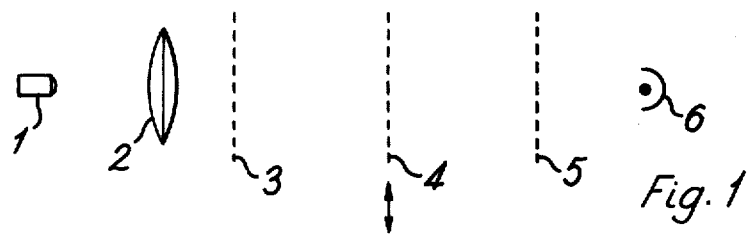
FIG. 1 is a diagram illustrating basic principles of the invention.

The basic principle of the present invention is illustrated in its conceptually simplest form in FIG. 1 of the accompanying drawings. In the system shown in FIG. 1, light from a lamp 1 concentrated by a lens 2 passes through three linear transmissive gratings 3, 4 and 5 to reach a photocell 6. The gratings 3 and 4 are mounted in parallel planes spaced apart by a distance $u$ with their lines parallel, the grating 4 having a spatial frequency $f_1$ and the grating 3 having a spatial frequency $f_2$. The grating 3 can be considered as defining a spatially periodic optical object which diffusely illuminates the grating 4.

If the conditions are such that the grating 4 acts as a diffraction grating, then it can be shown that an interference image will be formed by the grating 4 in a plane parallel to the grating 4 at a distance $v$ from the grating 4, where the distance $v$ is determined by the equation $$f_2/f_1 = 2v/(u + v) \quad (1)$$

This image will have a spatial frequency $f_3$ given by the equation $$f_3/f_1 = 2u/(u + v) \quad (2)$$

It can also be shown that a displacement of magnitude $d$ of the grating 4 relative to the grating 3 parallel to the planes of these gratings and perpendicular to their lines will cause a parallel displacement of the image, whose magnitude D is given by the equation $$D = d(1 + v/u) \quad (3)$$

It will thus be appreciated that by making the grating 5 of spatial frequency $f_3$ and mounting it parallel to the gratings 3 and 4 at the distance $v$ from the grating 4, with its lines parallel to those of the gratings 3 and 4, the image produced by the grating 4 will interact with the grating 4 to produce a cyclical variation in the intensity of the light reaching the photocell 6 as the gratings 3 and 4 are moved relative to one another parallel to their planes and perpendicular to their lines. Furthermore, since the grating 5 is fixed relative to the grating 3 it will be possible to deduce from the output of the photocell 6 the extent of such relative movement.

An explicit requirement is the condition that $f_2$ should be less than $2f_1$. This is in fact inherent in equations (1) and (2), from which one can readily derive explicit expressions for $v$ and $f_3$ in the forms $$v = uf_2/(2f_1 - f_2) \quad (4)$$

and $$f_3 = 2f_1 - f_2 \quad (5)$$

Obviously these expressions do not give sensible values unless $f_2$ is less than $2f_1$.

It will be seen from equation (1) that an interference image will be formed with $v$ equal to $u$ when the gratings 3 and 4 have the same spatial frequency, and from equation (2) it will be seen that in this case the image will have the same spatial frequency as the gratings 3 and 4.

For such an arrangement it is convenient to modify the system shown in FIG. 1 by using a reflecting grating in place of the grating 4 (as later described relative to FIGS. 2 and 4), so that the image plane will coincide with the plane of the grating 3. The result of this is that the system described can be reduced from a structure having three gratings to one having only two, although one of these gratings performs two functions (i.e. those of the gratings 3 and 5 in FIG. 1) in that it both defines a spatially periodic optical object and provides a spatially periodic structure with which the image can interact. Specific systems modified in this way will be further described below.

If the light incident on the grating 3 were perfectly collimated, no interference image would be formed. It is thus essential that the light incident on the grating 3 should be at least partially diffuse. In practice it is difficult to produce truly diffuse illumination of the grating 3 and it should be noted that with partially collimated light interference images may not be well formed at values of the distance $u$ approximating to $(N - \frac{1}{2})\lambda f_1 f_2$, where $N$ is an integer and $\lambda$ is the mean wavelength of the light used. Furthermore the contrast of any interference image formed will be unusably low if the value of the distance $u$ is less than $w^2/2\lambda_m$, where $\lambda_m$ is the maximum wavelength of the light used and $w$ is the pitch of the grating 4, since in these circumstances the light used would not be diffracted to any significant extent.

In the arrangement described the gratings 3, 4 and 5 are all mounted with their lines parallel so that the interaction of the image and the grating 5 to produce the cyclical variation in light intensity can be looked upon as a "shuttering" effect. Of course alternative methods are possible. Thus the lines of the grating 4 could be inclined slightly with respect to those of the gratings 3 and 5 so that when the image interacts with the grating 5 moire fringes will be produced which can be detected by a plurality of photocells spanning a single moire fringe. Alternatively, the grating 5 could have a slightly different spatial frequency from that of the image produced by the grating 4 so that what are known as vernier fringes are produced which can be detected in a manner similar to that used for the moire fringe case.

The discussion above is also applicable to the case of radial gratings used for the measurement of rotary displacement; in this case the quantities $f_1$, $f_2$ and $w$ should be taken as denoting the relevant parameters at the means radius of the grating system. The image contrast in this case will, however, diminish as compared to the linear grating case to an extent dependent on the variation of the pitch over the usable optical aperture of the system.

Figure 2:
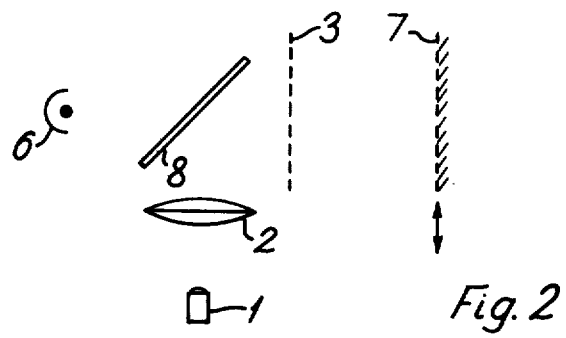
FIGS. 2 and 3 are diagrams illustrating modifications of the arrangement of FIG. 1.
Figure 3:
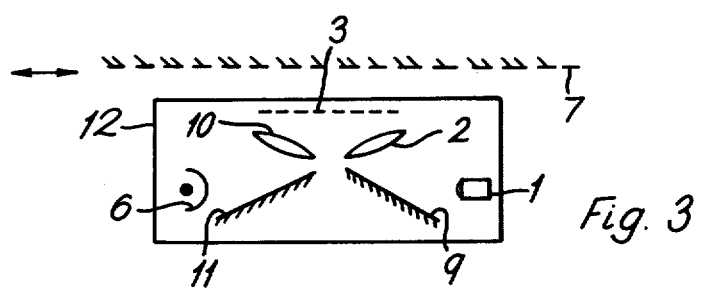

FIGS. 2 and 3 show two modifications of the system of FIG. 1, both using a reflecting grating 7 in place of the transmissive grating 4. In the system shown in FIG. 2, the light from the lamp 1 is concentrated by the lens 2 and is reflected by a semi-reflecting mirror 8 to pass through a transmissive 'index' grating 3 and thereby illuminate the reflecting 'scale' grating 7. The reflected light from the grating 7 passes again through the grating 3 and is transmitted through the semi-reflecting mirror 8 to be received by the photocell 6. In the system shown in FIG. 3, light from the lamp 1 is reflected from a mirror 9 and concentrated by the lens 2 and, after passing through the index grating 3, falls upon the reflecting scale grating 7. The reflected light from the grating 7 passes again through the grating 3 to reach the photocell 6 by way of a lens 10 and a mirror 11. The components 1, 9, 2, 3, 10, 11 and 6 are rigidly assembled to constitute a 'reading-head' 12 and the function of the device is to measure transverse relative movements between the reading-head 12 and the grating 7. In both these systems the spatial frequencies of the gratings 3 and 7 and the spacing between them are of course chosen in accordance with the principles discussed above.

In modifications of the arrangements shown in FIGS. 2 and 3, the photodetector means effectively constituted by the combination of the grating 3 and the photocell 6 could if desired be replaced by a single periodic structure combining the functions of a transmissive grating and a spatially periodic photodetector, the structure comprising an array of photosensitive elements respectively associated with the lines of the grating so as to receive light which has been reflected by the grating 7. Such a structure is for example described in U.S. Pat. No. 3,600,588. With such modifications, the arrangement used for illuminating the transmissive grating could of course be in a similar form to that used for illuminating the grating 3 in FIG. 1.

A further modification which is envisaged, and which would be applicable in principle to arrangements using either a transmissive or a reflecting grating to perform the imaging, is to replace the grating 3 illuminated from a separate source by a device incorporating an array of photoemissive elements to constitute the spatially periodic optical object. In the case where a reflecting grating is used to perform the imaging, this array of photoemissive elements could form part of a spatially periodic structure also incorporating an array of photosensitive elements interlaced with the photoemissive array.

Figure 4:
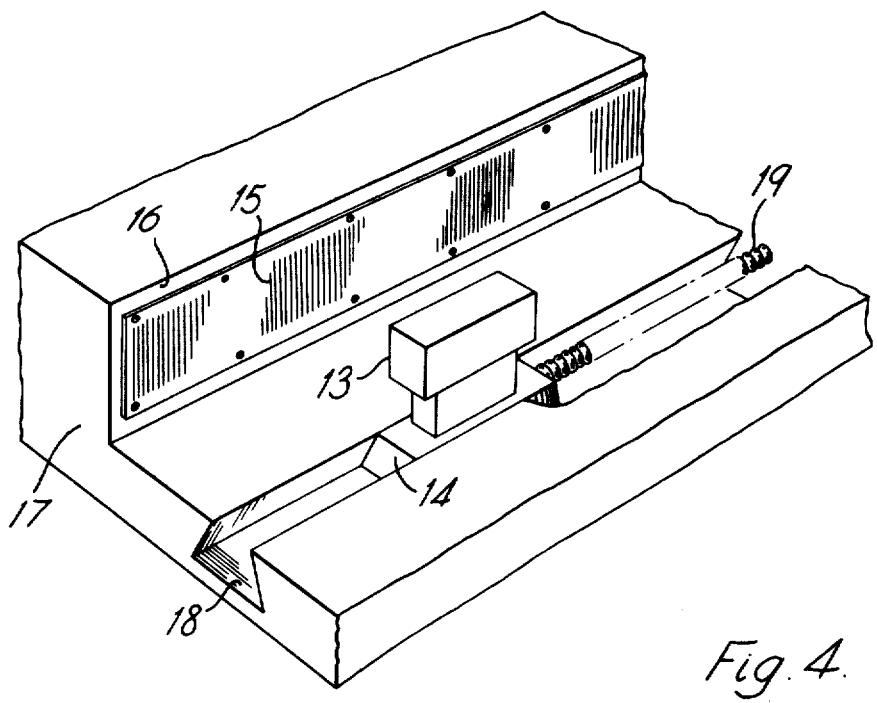
FIG. 4 is a diagrammatic perspective view of an apparatus according to the invention.
Figure 5:
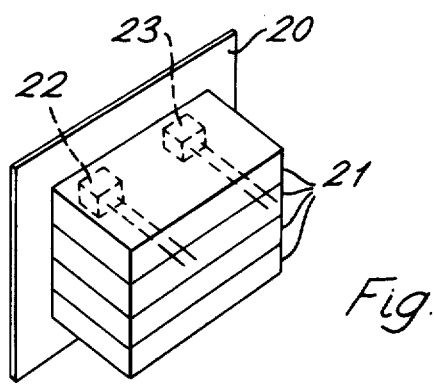
FIG. 5 is a diagrammatic perspective view of part of the apparatus of FIG. 4.

Considering now the embodiments of the invention illustrated in FIGS. 4 and 5, the apparatus includes a reading-head 13 rigidly mounted on a member 14, and a linear reflecting scale grating 15 rigidly mounted on a machined face 16 of a member 17. The member 14 is movable relative to the member 17 parallel to the plane of the grating 15 and perpendicular to its lines, the member 14 sliding in a channel 18 formed in the member 17 under the action of a lead screw 19; the resultant movement of the reading-head 13 relative to the grating 15 enables the extent and direction of relative movement between the members 14 and 17 to be measured. This relative movement may correspond to the movement of an element of a machine tool which it is desired to control. FIG. 5 is a perspective diagram showing part of a reading-head 13 of FIG. 4 and shows a linear transmissive index grating 20 which is suitably mounted within the reading-head 13 so as to face the grating 15 with a uniform spacing between the gratings 15 and 20. Secured by a suitable adhesive to the rear face of the grating 20 are four identical units 21, each unit 21 comprising a solid-state lamp 22 and a solid-state photodetector 23 encapsulated in a synthetic resin and provided with leads for supplying power to the lamp 22 and taking output signals from the photodetector 23. Light emitted by the lamps 22 passes through the grating 20 and is reflected by the grating 15 to form an image in the plane of the grating 20. Reflected light passing through the grating 20 falls on the photodetectors 23, each of which responds primarily to the reflected light emitted by the lamp 22 in its own unit 21, so that the output of each photodetector 23 varies cyclically when relative movement between the members 14 and 17 occurs.

The grating 20 is mounted in the reading-head 13 with its lines slightly inclined with respect to those of the grating 15 so that the image formed by the grating 15 produces moire fringes when it interacts with the grating 20. The units 21 are mounted on the rating 20 in such a manner that the four photodetectors 23 span a single moire fringe, so that the phases of the respective cyclical variations of the photodetectors 23 resulting from a relative movement between the members 14 and 17 differ in a sequence with increments of 90°.

Figure 6:
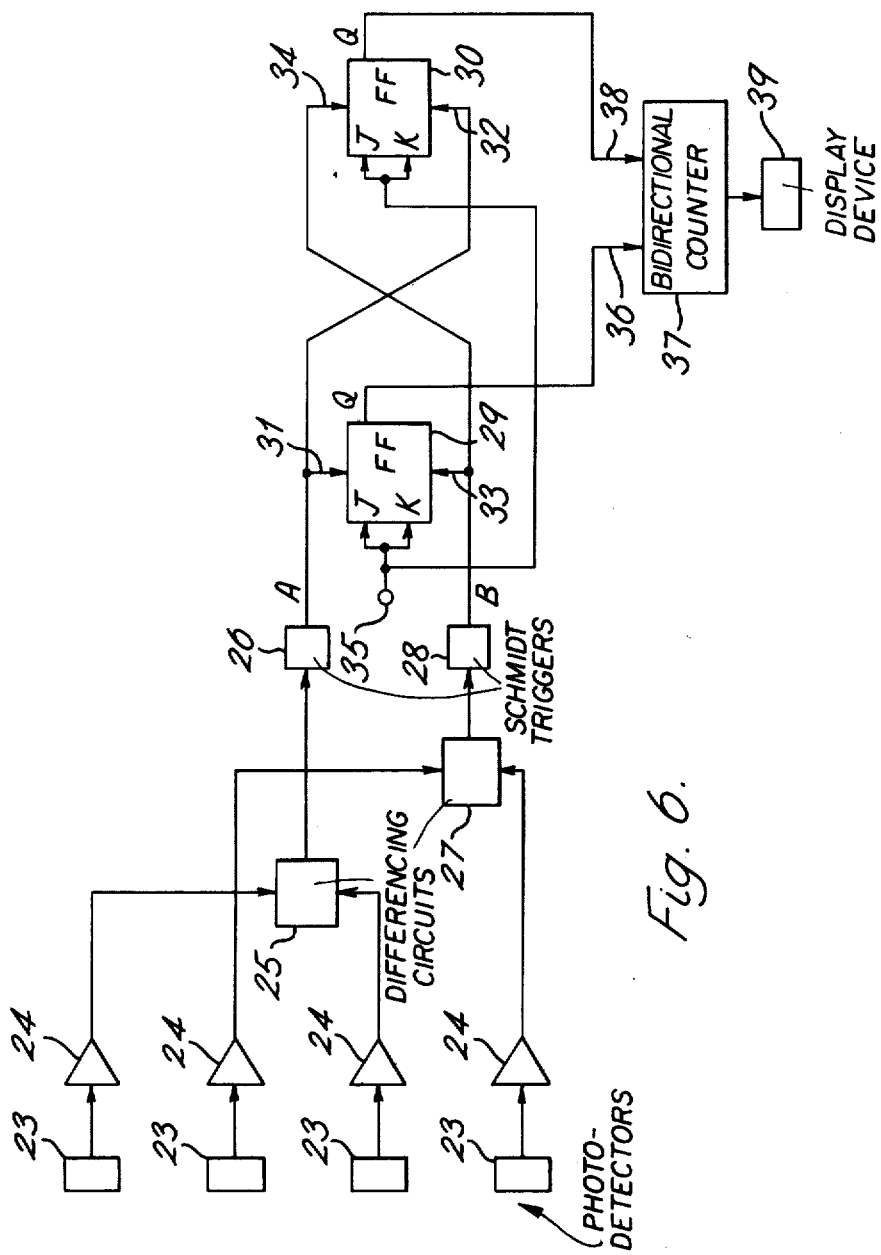
FIG. 6 is a schematic diagram of an electrical circuit for use with the apparatus of FIG. 4.

The diagram of FIG. 6 illustrates one method of using the outputs of the photodetectors 23 to determine the direction and extent of relative movement between the members 14 and 17. In the circuit of FIG. 6 the outputs of the photodetectors 23 are amplified by matched amplifiers 24 and the amplified outputs of the first and third photodetectors 23 in the phase sequence are subtracted in a differencing circuit 25, the output of which is taken to a Schmidt trigger 26 for squaring so as to produce a signal A. The amplified outputs of the other pair of photodetectors 23 are subtracted in a differencing circuit 27, the output of which is squared by a Schmidt trigger 28 to provide a signal B. It will be appreciated that when relative movement occurs between the members 14 and 17 the resultant variations in the respective magnitudes of the signals A and B will be in phase quadrature. The signals A and B are applied to a pair of J-K flip-flops 29 and 30, the signal A being fed to the clock input 31 of the flip-flop 29 and to the clear input 32 of the flip-flop 30, and the signal B being fed to the clear input 33 of the flip-flop 29 and to the clock input 34 of the flip-flop 30. Each of the flip-flops 29 and 30 has both its J and K inputs connected to a terminal 35 which is maintained at logic "one". The Q output of the flip-flop 29 is taken to the "up" input 36 of a bi-directional counter 37 and the Q output of the flip-flop 30 is taken to the "down" input 38 of the counter 37. The output of the counter 37 can be displayed on a suitable alphanumeric display device 39.

The effect of feeding the signals A and B to the flip-flops 29 and 30 in the manner described is that only one flip-flop can give an output to the counter 37 for a given direction of relative movement between the members 14 and 17; this is because the other flip-flop will always have a signal appearing at its clear input during the occurrence of a signal at its clock input, thus inhibiting a change in its Q-output. Which of the flip-flops 29 and 30 gives an output will depend on the sense of the phase difference between the signals A and B, which is determined by the direction of relative movement between the members 14 and 17. The number of pulses fed to the counter 37 by the relevant flip-flop will of course be proportional to the extent of the movement.

In the apparatus illustrated in FIGS. 4 and 5, the spatial frequencies of the gratings 15 and 20 and the spacing between them are of course chosen in accordance with the principles discussed above. For example, when using as the lamps 22 gallium arsenide infra-red light emitting diodes having a peak emission at a wavelength of 940 nanometers and using as the photodetectors 23 N-P-N silicon phototransistors, the gratings 15 and 20 may typically have a spatial frequency of 100 lines per millimeter and be spaced 2 centimeters apart.

We claim:

1. An apparatus for measuring displacement of a first member relative to a second member in a manner corresponding to motion with one degree of freedom in a given plane, said apparatus comprising:

a substantially planar grating mounted in a fixed position relative to said first member so as to lie substantially in a first plane parallel to said given plane, said grating having lines which are spatially periodic in the sense of said motion and having a given pitch, the spatial periodicity of said grating in said sense being denoted by $f_1$;

means for illuminating said grating diffusely with light and comprising means mounted in a fixed position relative to said second member and defining an optical object which lies substantially in a second plane parallel to said given plane and is spatially periodic in said sense, the spatial periodicity of said object in said sense being denoted by $f_2$ and being less than $2f_1$, the spacing between said first plane and said second plane being denoted by $u$, and said light including light of at least one given wavelength such that the product of that given wavelength and $u$ is not less than half the square of said pitch, for causing said grating to form a substantially planar image of said object extending substantially parallel to said given plane at a spacing $v$ from said first plane effectively determined by the equation $f_2/f_1 = 2v/(u+v)$, said image being spatially periodic in said sense with a periodicity $f_3$ effectively determined by the equation $f_3/f_1 = 2u/(u+v)$ and moving in said manner relative to said second member when relative movement in said manner occurs between said first and second members; and photodetector means responsive to light of said given wavelength and comprising means mounted in a fixed position relative to said second member and defining a light-receiving array which lies at least approximately in the plane of said image and which is spatially periodic in said sense with a periodicity at least approximately equal to $f_3$ for producing at least one signal which varies cyclically by virtue of interaction between said image and light-receiving array which said relative movement occurs between said first and second members.

2. An apparatus according to claim 1, in which said grating is a reflecting grating and said second plane is substantially coincident with said array.

3. An apparatus according to claim 2, in which said means defining said object is a transmissive grating, and said illuminating means includes at least one light source operative to illuminate diffusely said transmissive grating on the side remote from said reflecting grating.

4. An apparatus according to claim 3, in which said means defining said light-receiving array is also constituted by said transmissive grating, and said photodetector means includes at least one photocell disposed to receive light which has been reflected by said reflecting grating and then transmitted through said transmissive grating.

5. An apparatus according to claim 4, in which the product of said given wavelength and the spacing between said first and second planes is many times the square of said pitch.

6. An apparatus according to claim 1, in which said grating is transmissive.

7. An apparatus according to claim 1, in which said grating is a diffraction grating, $f_3 = f_2 = f_1$ and $v = u$.

8. Apparatus as in claim 1 wherein $f_2$ is at least approximately equal to $f_1$.

9. Apparatus as in claim 1 wherein said grating is a reflecting grating and $f_2$ is at least approximately equal to $f_1$.

10. Apparatus as in claim 1 including an array of photoemissive elements forming said illuminating and spatially periodic optical object defining means.

11. Apparatus as in claim 1 including a transmissive grating and separately therefrom, on the side thereof opposite said planar grating, at least one light source which together with said transmissive grating forms said illuminating and spatially periodic object defining means.

12. Apparatus as in claim 1 in which a single periodic photosensitive grating structure forms said photodetector and spatially periodic light-receiving array defining means.

13. Apparatus as in claim 1 including a transmissive grating and separately therefrom, on the side thereof opposite said planar grating, at least one photodetector which together with said transmissive grating forms said photodetector and spatially periodic light-receiving array defining means.

14. Apparatus as in claim 1 in which the spatial frequency of said array defining means is slightly different from that of said image formed by said grating for causing vernier fringes detectable by said photodetector means.

15. Apparatus as in claim 1 in which each of the planar grating and said object and array defining means have a respective group of spatially periodic parallel lines, the lines aforesaid in claim 1 for said planar grating being included in said line group therefor.

16. Apparatus as in claim 5 in which the said lines of all said groups are substantially parallel to each other.

17. Apparatus as in claim 15 in which the said lines of one of said groups are slightly inclined relative to the lines of another said group.

18. Apparatus as in claim 17 in which the lines of said grating are substantially perpendicular to the direction of said relative movement and the lines of said object and array defining means are slightly inclined relative to the said substantially perpendicular lines for causing the interaction of said image and array defining means to generate a moire fringe pattern, said photodetector means including a plurality of photodetectors disposed to detect said pattern.

19. Apparatus as in claim 18 in which said plurality of said photodetectors are disposed to span the pattern of a single moire fringe.

20. Apparatus as in claim 19 in which the phases of the respective cyclical variations of said plurality of photodetectors, resulting from said relative movement of said first and second members, differ in a sequence with increments of 90°.

21. Apparatus for measuring displacement of a first member relative to a second member in a manner corresponding to motion with one degree of freedom in a given plane, said apparatus comprising:

a substantially planar reflecting grating having a given pitch and mounted in a fixed position relative to said first member so as to extend substantially parallel to said given plane;

substantially planar transmissive grating means mounted in a fixed position relative to said second member so as to extend substantially parallel to said given plane;

said reflecting grating and said transmissive grating means being spaced apart and being spatially periodic in the sense of said motion with at least approximately equal periodicities;

means for diffusely illuminating said transmissive grating means with light on the side of said transmissive grating means remote from said reflecting grating, said light including light of at least one wavelength such that the product of that wavelength and the spacing between said reflecting grating and said transmissive grating means is not less than half the square of said pitch, whereby there will be formed by said reflecting grating an image of an optical object defined by said transmissive grating means, said image being disposed at least approximately in the plane of said transmissive grating means; and photodetector means responsive to light of said at least one wavelength by means of which said image is formed, said photodetector means comprising at least one photocell disposed to receive light which has been transmitted through said transmissive grating means, then reflected by said reflecting grating, and finally retransmitted through said transmissive grating means.

22. Apparatus as in claim 21 in which the lines of said transmissive grating means are slightly inclined with respect to the lines of said reflecting grating for causing the interaction of said image with said transmissive grating means to generate a moire fringe pattern, and said photodetector means comprises at least one pair of photocells disposed to receive light which has been transmitted through said transmissive grating means, then reflected by said reflecting grating, and finally retransmitted through said transmissive grating means, the respective positions of said pair of photocells corresponding to parts of said fringe pattern between which there is a relative displacement of one quarter of a fringe.

23. Apparatus as in claim 21 wherein said transmissive grating means is a single transmissive grating.

* * * * *